(12) United States Patent
McConnell et al.

(10) Patent No.: US 9,440,577 B2
(45) Date of Patent: Sep. 13, 2016

(54) VEHICLE WRECKER WITH IMPROVED CONTROLS

(71) Applicants: Ralph McConnell, Chattanooga, TN (US); Joseph C Brown, Chattanooga, TN (US); John L Hawkins, Hixson, TN (US); William G Miller, II, Georgetown, TN (US); Mark Dyer, Ooltewah, TN (US)

(72) Inventors: Ralph McConnell, Chattanooga, TN (US); Joseph C Brown, Chattanooga, TN (US); John L Hawkins, Hixson, TN (US); William G Miller, II, Georgetown, TN (US); Mark Dyer, Ooltewah, TN (US)

(73) Assignee: Miller Industries Towing Equipment, Inc., Ooltewah, TN (US)

( * ) Notice: Subject to any disclaimer, the term of this patent is extended or adjusted under 35 U.S.C. 154(b) by 29 days.

(21) Appl. No.: 14/247,072

(22) Filed: Apr. 7, 2014

(65) Prior Publication Data

US 2015/0284219 A1   Oct. 8, 2015

(51) Int. Cl.
*B60P 3/12*     (2006.01)
*B60P 1/54*     (2006.01)
*B66C 13/18*    (2006.01)

(52) U.S. Cl.
CPC ............... *B60P 3/12* (2013.01); *B60P 1/5433* (2013.01); *B66C 13/18* (2013.01)

(58) Field of Classification Search
USPC ............... 414/563, 480, 409, 680; 180/89.1
See application file for complete search history.

(56) References Cited

U.S. PATENT DOCUMENTS

| 3,784,035 | A  | * | 1/1974 | Dunbar | B66C 23/78 212/302 |
|---|---|---|---|---|---|
| 6,092,975 | A  | * | 7/2000 | Cannon et al. | 414/563 |
| 6,431,346 | B1 | * | 8/2002 | Gilmore | B65G 21/14 198/588 |
| 6,746,067 | B2 | * | 6/2004 | Schmidt | B60K 37/06 180/326 |
| 7,654,457 | B2 | * | 2/2010 | Wilson | G07C 13/00 235/386 |
| 2006/0237565 | A1 | * | 10/2006 | Barker | A01K 89/0114 242/229 |
| 2008/0162005 | A1 | * | 7/2008 | Tang | B66C 13/40 701/50 |
| 2009/0285662 | A1 | * | 11/2009 | Addleman | B66C 23/80 414/563 |
| 2010/0314001 | A1 | * | 12/2010 | Kappel | A01G 23/067 144/334 |

* cited by examiner

*Primary Examiner* — Gerald McClain
*Assistant Examiner* — Ronald Jarrett
(74) *Attorney, Agent, or Firm* — Michael P. Mazza, LLC

(57) ABSTRACT

A wrecker-type recovery vehicle for recovering other, disabled vehicles, and a method for doing so, which may use a CAN Bus, and which may employ wrecker controls located a distance from a side surface of the vehicle exterior. Traveler rollers may be used to facilitate longitudinal movement of a travel base assembly supporting the boom, relative to the vehicle frame.

22 Claims, 6 Drawing Sheets

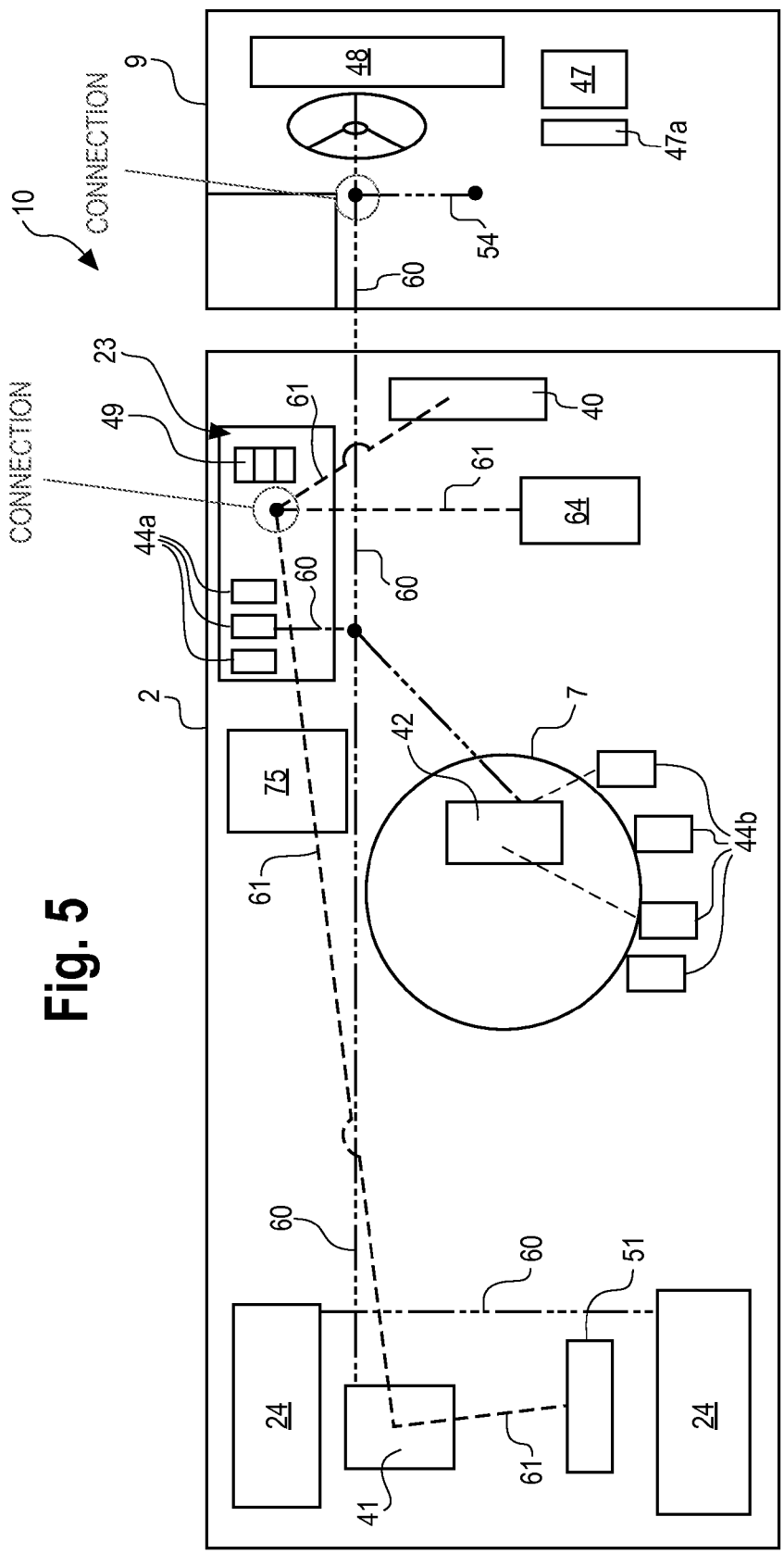

VEHICLE WRECKER WITH IMPROVED CONTROLS

BACKGROUND OF THE INVENTION

Pending U.S. Ser. No. 13/565,100, titled "Traveler Roller," filed Aug. 2, 2012, is hereby incorporated by reference in its entirety into this patent application.

The present invention generally relates to vehicle recovery devices with masts and booms ("vehicle wreckers"), including those that can be rotated ("rotating wreckers"), as well as those which cannot be rotated, and whose supporting travel base can be moved along the longitudinal axis of the wrecker, to increase the reach of the boom. Such large vehicle wreckers ("heavy wreckers") allow a large load to be lifted and then moved a given distance forward or rearward along the wrecker longitudinal axis.

The hydraulic controls for vehicle wreckers are typically located on a control panel located on the sidewall of the unit. A controller module sends electrical signals through a wiring harness to actuate solenoids at the hydraulic control valve spools. Wireless remote control systems communicating by radio signal with the controller module have also been utilized. However, vehicle wrecker users insist on redundant mechanical, manual back-up controls directly linked to the hydraulic valve, in the case of electrical failure. Such manual systems depend upon either mechanical linkages or cables, both of which restrict where the control levers and valves can be located.

The controls on a rotator or other heavy wrecker are typically located inside of a toolbox mounted on a sidewall of the wrecker, and are not comfortable for the wrecker operator to access, particularly if the operator is less than average height (see prior art FIG. 1). The toolbox may also partially shield the view of the operator as he attempts to work the controls and establish necessary sight lines during operation of the hydraulics for controlling outrigger, boom and winch movement.

Wreckers also typically have separate and independent controls for hydraulic boom, hydraulic outrigger and/or underlift and electrical (e.g., lighting) systems. (An underlift may be located in the rear of the wrecker.)

Accordingly, it would be advantageous to provide wrecker controls that are more easily accessible, as well as more ergonomically and visually appealing. It would also be advantageous to provide wrecker controls that eliminate redundant control levers, and are not tethered to a particular location on the wrecker. Further, it would be advantageous to integrate electrical and hydraulic controls on the same panel or touchscreen.

SUMMARY OF THE INVENTION

The objects mentioned above, as well as other objects, are solved by the present invention, which overcomes disadvantages of prior wreckers, while providing new advantages not previously associated with them.

In a preferred embodiment of the invention, a wrecker-type recovery vehicle for recovering disabled vehicles is provided. The wrecker-type recovery vehicle includes a vehicle frame extending along a longitudinal axis, having a vehicle body with side surfaces, and carrying an extensible and retractable boom. Manually-manipulable wrecker controls may be moveable from a first position within the vehicle body or a compartment therefor, to a second position located a distance (e.g., 1-2 feet) from a side surface of the vehicle body, in a direction perpendicular to the longitudinal axis.

In a preferred embodiment, the wrecker controls may be located on an outwardly-opening door associated with a compartment located within an interior of the vehicle. Alternatively, for example, the wrecker controls may be located on an outwardly-sliding shelf within a compartment located within an interior of the vehicle. Preferably, the support for the wrecker controls (e.g., whether a door or a shell) may be positioned in a downwardly-angled orientation to create an ergonomic-oriented work station.

In a preferred embodiment, the wrecker controls may be in electrical communication with a CAN Bus and CAN controller of the vehicle. The wrecker controls may include: boom controls and/or lighting controls, and may include integrated electrical and hydraulic controls located on a single console, or in a pair of consoles, each of which are located on opposing sides of the wrecker. More preferably, the wrecker controls may include controls for: boom, winch, underlift, outrigger and lighting controls. It is also preferred that the wrecker controls include manual hydraulic controls which may be used in the event of an electrical failure.

In one type of wrecker useable with the present invention, the vehicle frame supports a travel base assembly carrying the boom, and the travel base assembly is capable of moving along the longitudinal axis of the frame. The boom may be of the traveling or non-traveling type, however, and the boom may also be of the rotating or non-rotating type.

In a preferred embodiment using a wrecker with a traveling boom, one or more traveler rollers are used to at least partially support the travel base assembly and to facilitate longitudinal movement of the travel base assembly relative to the vehicle frame. The individual rollers may be movable about a load-bearing member, and may be linked by a chain assembly.

In an alternative embodiment, a wrecker-type recovery vehicle for recovering other, disabled vehicles is provided, and includes a vehicle frame extending along a longitudinal axis, having a vehicle body with side surfaces, and carrying an extensible and retractable boom. Manually-manipulable wrecker controls in electrical communication with a CAN Bus and CAN controller of the vehicle are provided. The wrecker controls include integrated electrical and hydraulic controls located on a single console, or in a pair of consoles located on opposed side surfaces or compartments of the wrecker. Preferably, the wrecker controls are moveable from a first position within the vehicle body or a compartment therefor, to a second position located a distance from a side surface of the vehicle body, in a direction perpendicular to the longitudinal axis.

A method for controlling a wrecker-type recovery vehicle for recovering other, disabled vehicles is also provided. A wrecker vehicle frame extends along a longitudinal axis; the vehicle frame has a vehicle body with side surfaces, and carries an extensible and retractable boom. Manually-manipulable wrecker controls are provided, and moveable between a first position in which the wrecker controls are located within the vehicle body or a compartment therefor, to a second position in which the wrecker controls are located a distance from a side surface of the vehicle body, in a direction perpendicular to the longitudinal axis. By manipulating the wrecker controls, an operator in a standing position adjacent the side surface of the vehicle body can maintain his/her sightlines, including visual observation of forward-most and rearward-most boom locations. Again, the wrecker controls may include one or more of the following;

boom, winch, underlift, outrigger and lighting controls. Also, traveling/non-traveling and/or rotating/non-rotating boom types may be used with the present invention. Traveler rollers may, but need not be, used.

Using the method of the present invention, the boom may be used, for example, to lift a load either: (a) from a position adjacent a rear of the recovery vehicle to a position both rearwardly and substantially distant from the rear of the wrecker; or (b) from a position adjacent a front of the recovery vehicle to a position adjacent a side of the recovery vehicle.

DEFINITION OF CLAIM TERMS

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 5 is a top, schematic view of a preferred embodiment of the rotating wrecker of the present invention.

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which, make insubstantial changes in function, in purpose, in structure, or in result are intended to be covered by the claims of this patent.

Figure 1:
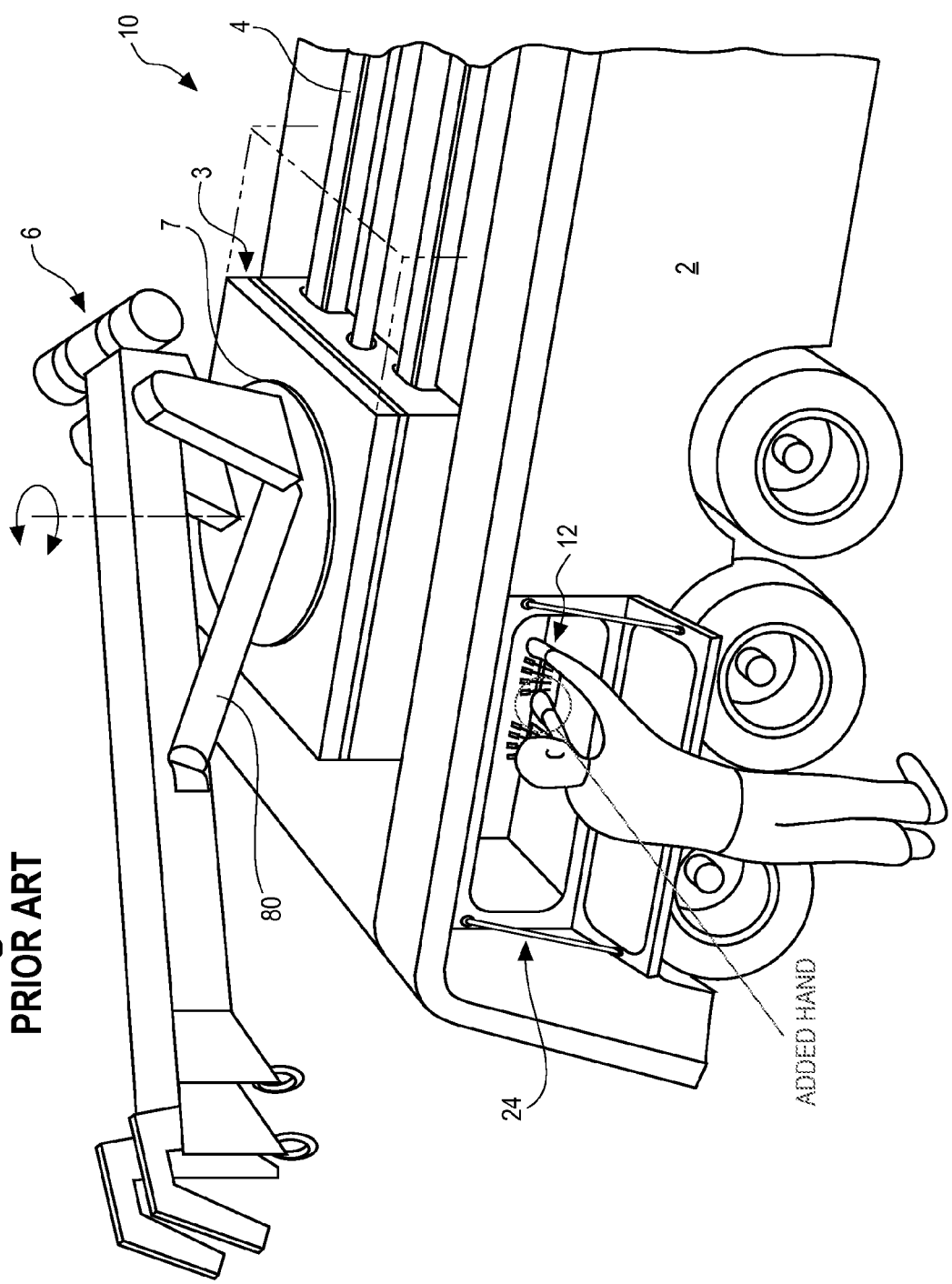
FIG. 1 is a partial side and top perspective view of a prior art rotating wrecker with side tool box and wrecker controls located within the tool box.
Figure 2:
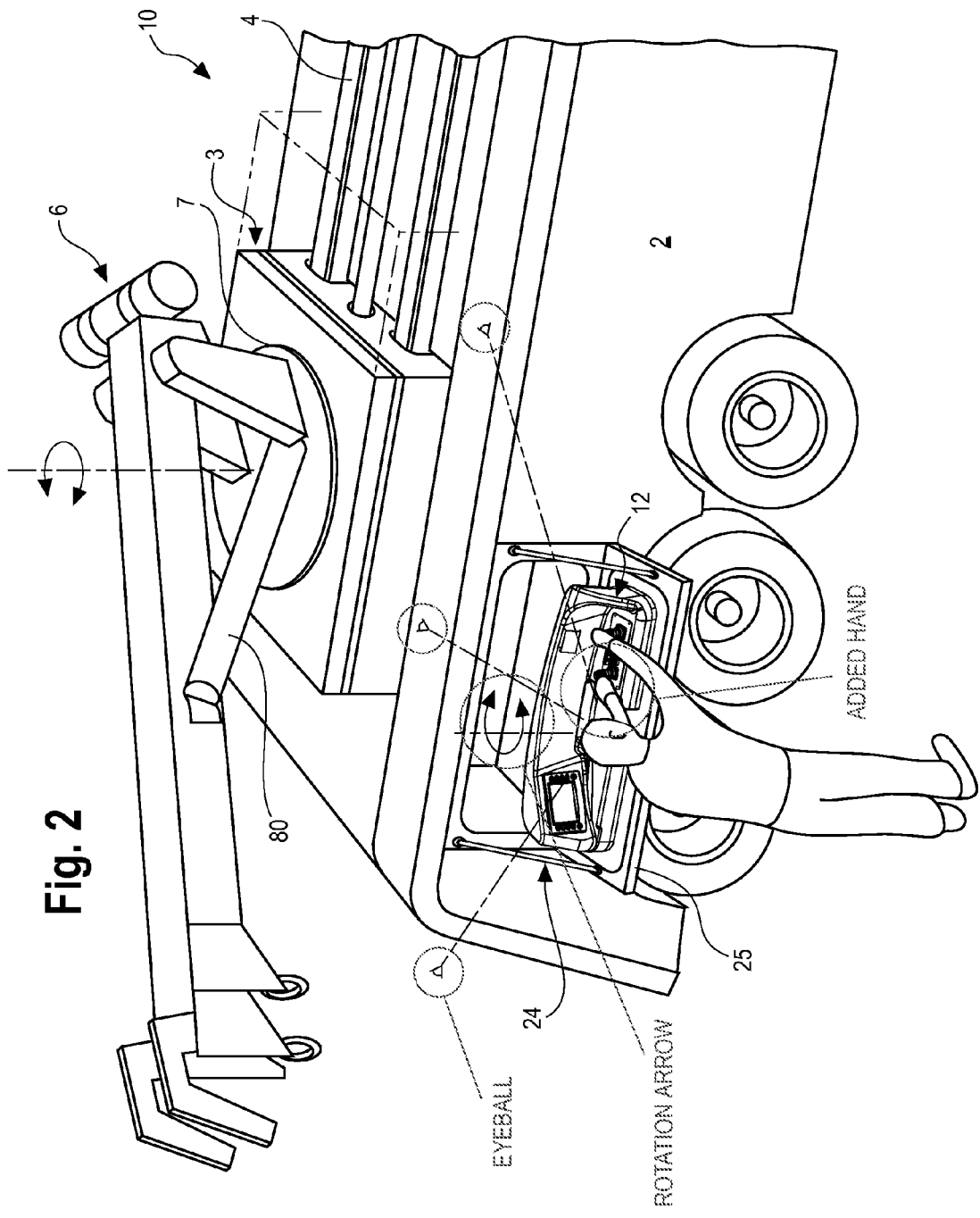
FIG. 2 is a view similar to FIG. 1 showing a side tool box of one embodiment of the present invention with wrecker controls of this embodiment of the present invention located on a hinged door of the tool box.

Referring now to prior art FIG. 1, rotating wrecker 10 with body 2 includes a wrecker assembly 8 with a telescoping boom 5 mounted on rotating bearing 7, which is in turned mounted on travel base assembly 3. Travel base assembly 3 moves over travel tubes 4 along the longitudinal axis of the rotating wrecker, in the direction of the double-arrow. As disclosed in U.S. Ser. No. 13/565,100, between travel base assembly 3 and travel tubes 4, bearing pads, or alternatively one or more traveler rollers (i.e., rollers moveable about a load bearing member), may be located to facilitate movement of the travel base assembly over travel tubes 4. As can be seen in FIG. 1, conventionally, wrecker controls 12 are located within a side tool box 24 on the wrecker body 2. Due to this location, an operator, bent forward from the waist in order to use wrecker controls 12, has his/her sigh times of boom movement and the exterior reaches of the wrecker substantially compromised by the tool box and wrecker side exterior Referring now to a preferred embodiment of the present invention shown in FIG. 2, new wrecker controls 30 may be located on a hinged, outwardly-opening door 25 of tool, box 24. Because the wrecker controls 30 are located on the door, spatially displaced from the inside of tool box 24, the operator can stand in a normal, vertical position, without having to bend forward, to work the controls. Preferably, the angle of the open door and the wrecker controls are oriented and situated at a suitable height to create an ergonomic work surface in about the same plane as the arms of an operator of average heights, when his/her arms are raised to a comfortable working position. The operator so situated is also provided with enhanced sight lines, as shown in FIG. 2, because the operator's head is no longer within, or closely adjacent the interior of, the tool box, enabling the operator to observe forward-most and rearward-most boom locations during its movement.

Alternatively, it will be appreciated that the same or similar ergonomic and enhanced sightline advantages may be obtained by locating wrecker controls on a forwardly-sliding shelf within a cabinet disposed within a side surface of the wrecker, for example.

Figure 3:
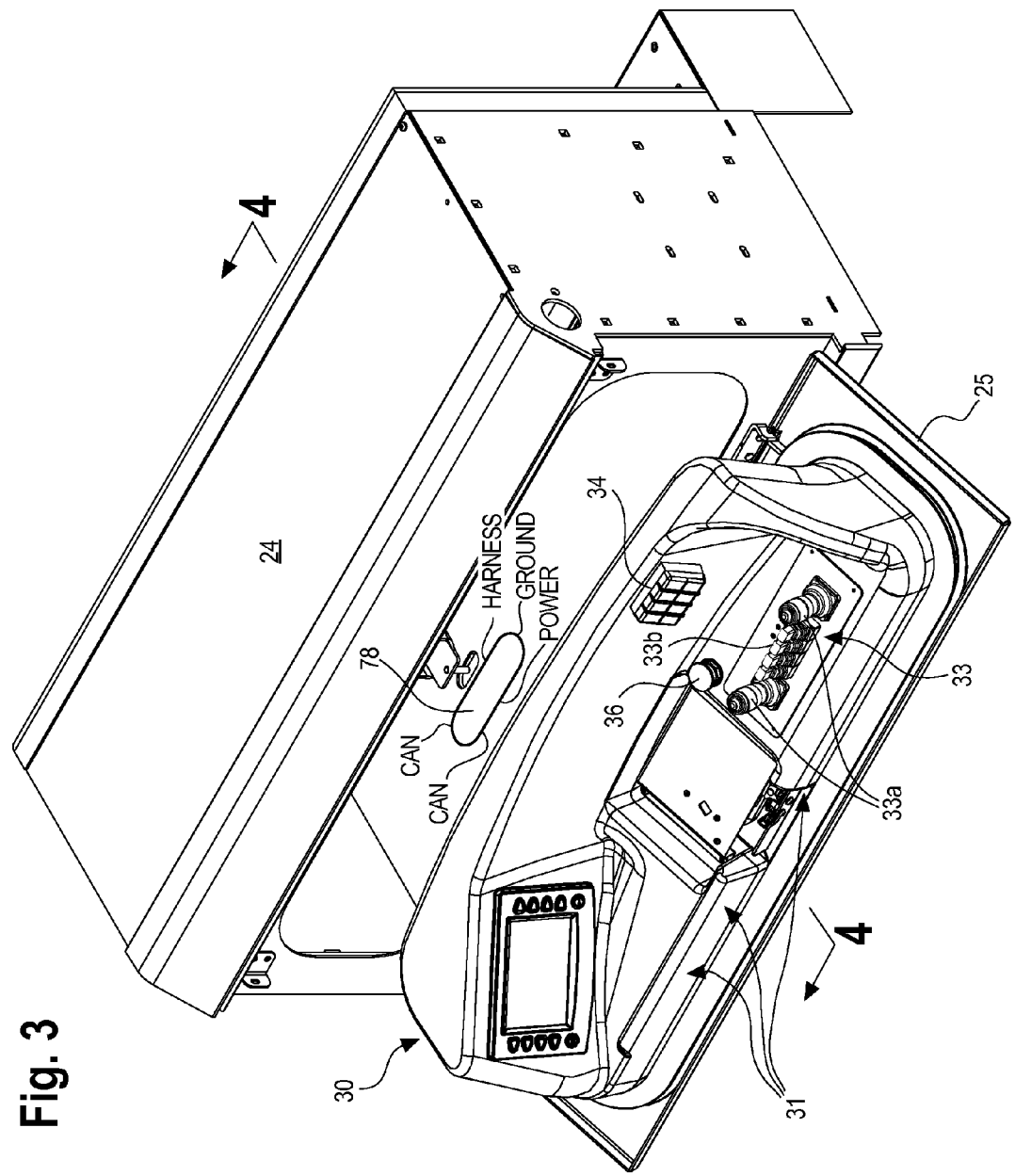
FIG. 3 is an enlarged top and side perspective view of the side tool box and wrecker controls shown in FIG. 2.

Referring now to FIG. 3, outwardly-opening door 25 of wrecker side tool box 24 is shown. A console 30 such as a console made of a composite material, may be rigidly mounted (such as adhesively mounted, or attached using fasteners) on door 25, as shown. Console 30 may support wrecker controls generally designated as 31. As one non-limiting example, wrecker controls 31 may include a monitor or touchscreen 32 (e.g., CAN Bus PV780 touchscreen display), manual joystick 33a and paddle 33b controls, underlift control buttons 34, and emergency stop button 38. In one example; left joystick 33a may provide control over boom 5 (e.g., in/out, up/down, and "twist" for swing of the boom, by rotating bearing 7 about its vertical axis), using boom lift cylinder 80 (see FIG. 1), as well as telescoping cylinders (not shown) to extend or retract the boom; right joystick 33a may control movement of the main winches (not shown), including "twist" for their travel; and paddles 33b may be used to control auxiliary winches located, for example, outboard and rear of the turret base (not shown), which may rotate with the boom. Referring to FIG. 2, one or more of the joysticks, or other manual levers, may also be used to move travel assembly 3 along travel tubes 4, carrying the boom in a direction along the longitudinal axis of the vehicle frame. Referring back to FIG. 3, controls may also be provided at console 30, such, as using touchscreen 32, to extend or retract wrecker hydraulic outrigger legs, as is known in the art, in order to stabilize the wrecker during recovery operations. Underlift controls 34 may be used to extend or retract an underlift located at the rear end of the wrecker, to allow recovery of a disabled vehicle by its front wheels, for example. Additionally, touchscreen 32 may also be used to control lighting functions, as further discussed below.

Figure 3A:
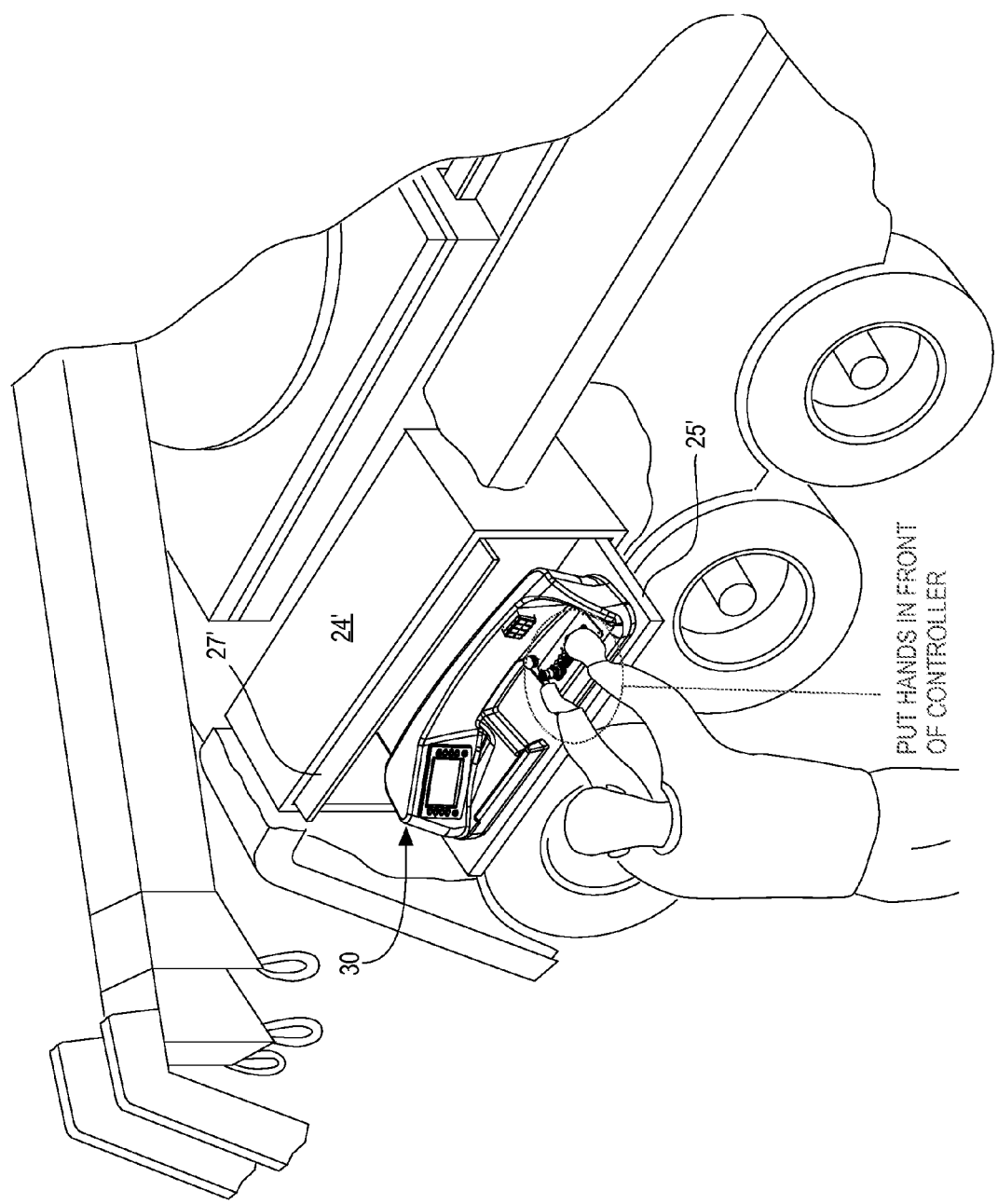
FIG. 3A is a view similar to FIG. 3 of an alternative embodiment of the side tool box.

Referring to FIG. 3A, an alternative embodiment of side toolbox 24' is shown utilizing a shelf 25' supporting console 30 which slides in and out of toolbox 24', and an upper door 27' which can close the toolbox from the top.

Figure 4:
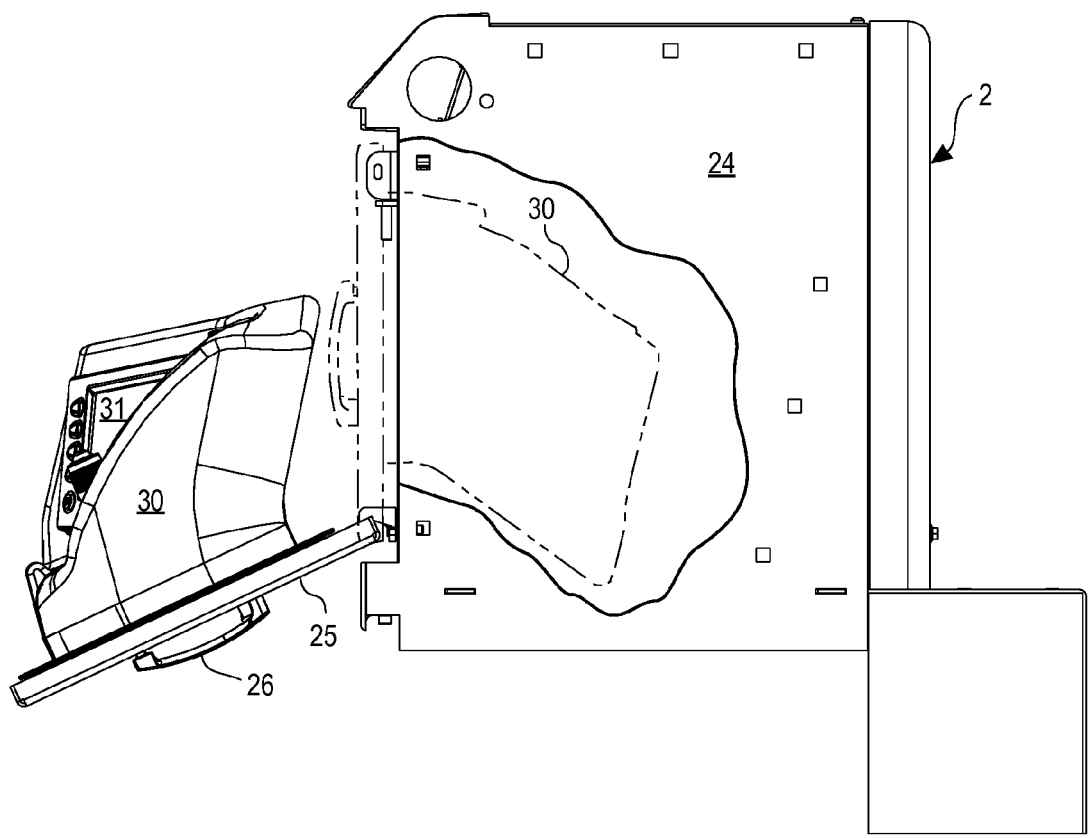
FIG. 4 is a side view of the tool box and wrecker controls shown in FIG. 3.

FIG. 4 shows a side view of tool box 24, and door 25 with door handle 28, and console 30. When door 25 is closed, the outline of console 30 can be seen within the compartment of tool box 24. It can be appreciated from this view that the operator's head will be displaced a substantial distance (e.g., about 2-3 feet) from a side surface of the exterior of the wrecker during the operator's use of the door-mounted wrecker controls.

Referring now to FIG. 5, a top schematic view of a preferred embodiment of wrecker 10 of the present invention is shown, including front cab 9 and rear body 2. In this embodiment, front and rear outrigger valves 40, 51 may be located as shown. Upper front/turret hydraulic control valve 42 may be located on rotating turret 7 (shown in FIG. 1).

Conventional wrecker controls use mechanical linkage between the control levers (located in a toolbox on the sidewall of the wrecker) and the hydraulic valve spool. The new wrecker controls of the present invention, may be mounted, on a door of the toolbox (see FIG. 3) or directly mounted on the wrecker sidewall (not shown). As can be seen, the wrecker controls are mounted at a more comfortable height, and angled to create an ergonomic work surface in the same plane as the operator's arms when raised to a comfortable working position, than the conventional wrecker controls mounted within the interior or the tool box as shown in FIG. 2.

Instead of using mechanical linkage connected to the control levers, joysticks and paddles are provided, specific examples of which are described below, that are connected "fly-by-wire" via a CAN ("Controller Area Network") Bus circuit to the electrical solenoid-operated hydraulic control valve. (In a "fly-by-wire" system, control movements are converted to electrical signals transmitted by wires, and a computer or controller module determines how to move the actuators at each control surface to provide the ordered response.) CAN Bus is a vehicle bus standard designed to allow microcontrollers and devices to communicate with each other within a vehicle without a host computer. CAN Bus is a message-based protocol, designed specifically for automotive applications but now also used in other areas such as aerospace, maritime, industrial automation and medical equipment. The devices that are connected by a CAN network are typically sensors, actuators, and other control devices. These devices are not connected directly to the bus, but through a host processor and a CAN controller.

To create an ergonomic and visually appealing control station, a mock-up of control station 30 was clay-molded, including display screen, joy sticks, paddles and push buttons, and this clay model was then scanned into a 3D model for use in manufacturing this part from composite material (see FIG. 3). The resulting control panel 30 provides: (1) improved ergonomics for the operator; (2) improved sight lines for the operator; (3) reduced mechanical complexity in the assembly of the unit; and (4) a hydraulic control valve that can be located anywhere on the wrecker because the restrictions created by routing mechanical linkages are eliminated. The control panel also integrates electrical (e.g., lighting) and hydraulic (e.g., boom, outrigger, winch, underlift) controls, which is believed unique in the wrecker industry.

In case of electrical failure, small over-ride handles may be located on top of the main hydraulic control valves. In an emergency, these handles can be accessed by opening a cover near the valve (not shown), to allow the hydraulic controls to be manually controlled.

In a preferred embodiment, using the CAN Bus, all of the hydraulic functions and switch functions may be controlled using 4 wires (2 for CAN, a power, and ground, bundled within harness 78, as shown on FIG. 3). This system permits control over all winch-related switches using the touchscreens to control mobile vehicle electronic control modules ("MVECs") via the CAN Bus. The system also permits control over all lights (beacon, work, brake, turn, markers and back-up) using the same scheme. It also allows control of the hydraulics via the CAN network, simplifying control station installation time significantly.

Referring to FIGS. 2, 3 and 5, a pair of control station modules 30 may each be located on a door of each rear tool box 24; these modules may be based on the use of CAN Bus networking for the components. Referring to FIG. 5, wireless receiver/controllers 44, such as Omnex R260 wireless receiver/controllers available from Eaton (Omnex near Vancouver, Canada, merged with Cooper-Bussmann, and then was purchased by Eaton), may be located as follows (e.g., 5 associated with turret 7 and 3 associated with front-side tool box 23).

Referring to FIG. 5, the CAN connections are shown by solid line 60, while hard wires are shown by dotted lines 81. A computer monitor, such as front PY450 touchscreen display 48, available from F. W. Murphy of Tulsa, Okla. (now a division of Enovation Controls), connects to CAN and to power, and sends and receives electrical signals.

The truck J1939 CAN bus 54 connects to CAN 60. Using this connection, the operator can control brake, turn, markers and back-up lights, and monitor truck information such as RPM, engine temperature and fuel level.

A remote control unit, such as a trusted wireless transmitter 47, may be provided in cab 9, and docked in a smart dock/charger 47a. Transmitter 47 may be an Omnex T110 remote available from Eaton Corporation (Omnex merged with Cooper-Bussmann, which was then acquired by Eaton), and may be connected to power and ground (for charging), and may also connect to front touchscreen display 48 as an input (there/absent).

Preferably one or more mobile vehicle electronic control modules (MVECs) 49 may be located in the front-side tool box 23 for outputting signals for lighting. For example, three Bussman MVECs 49 available from Eaton, may be used for this purpose, and connected to battery (not shown) and to wireless receivers/controllers 44a. MVECs 49 may be output to electrical junction box 75, and to both front and rear outrigger hydraulic valves 40,51 and to rear hydraulic control valve 41. (Front outrigger control valve 40 may be centered above front outriggers (not shown), and rear outrigger control valve 51 may be located above right rear outrigger (not shown)).

Three lower R260 wireless receivers/controllers 44a may be used to interpret the CAN signals from monitors or displays 31, 48, and truck the CAN bus to turn the MVEC outputs on/off, including body, marker, brake and turn lights, generically referenced by box 84. Lower R260s 44a may also be employed to send and receive radio remote inputs, and create signals for rear hydraulic control valve 51, which may control travel, underlift and drag winch features, and control winch switching features. Controllers 44a may also be used to send a CAN signal to the upper control loop via an electrical swivel (not shown). (As is well known in the art, an electrical swivel, consisting of a series of electrical contacts on a drum which rotates with, turret 7, allows the boom to rotate without interfering with electrical functions.)

Wireless receivers/controllers, such as four upper Omnex R260s 44b available from Eaton, which may be located in turret 7, may be employed to receive CAN signals, power and ground and activate various functions on upper hydraulic control valve 42 also located in turret 7, which may be used to control winches, boom and swing.

Depending on output requirements, it will be understood by persons of ordinary skill that a lesser or greater number of MVECs and receivers/controllers may be used.

As shown in FIG. 3, a control panel module 30 may be mounted on each door 25 of rear tool boxes 24, located on each side of the wrecker. Control panel module 30 may include a monitor or touchscreen displays, such as a PV780 touchscreen display 32 available from F. W. Murphy, as well as (e.g.) Eaton underlift-control keypad 34, h and Omnex keypad 33 with (e.g.) paddles 33b and/or joysticks 33a, each of which may be connected to CAN and to power, and configured to send and receive electrical signals. For example, joysticks 33a and/or paddles 33b may be configured to send a CAN signal to each of R260s 44a, 44b, while underlift keypad 34 on control panel 30 may be configured to send, a CAN signal to main R260 injunction box 75.

A remote control unit (ECU, not shown), such as an Omnex Raptor remote available from Eaton, may be located in a passenger-side rear compartment, and may be carried by the operator. The ECU may be used to transmit and receive radio signals from main R260, and allows remote control over all boom and winch functions, and allows the operator to lock-in the winches. The ECU also allows the operator to see the load on the boom.

Persons of ordinary skill in this art will now appreciate that the preferred system disclosed here includes the following features:
- CAN-based control of lighting from multiple locations on the wrecker (e.g., the cab, and control consoles 30);
- CAN-based control of boom hydraulics from, either side of the vehicle (control consoles 30 on door 25 of each side toolbox 24) and from a remote/RCU (the Eaton Raptor remote, for example);
- CAN-based control of underlift hydraulics using on/off style remote/RCU;
- CAN-based engine info and diagnostics;
- CAN-based turn, marker, backup, and body lighting (using touchscreen 32 at consoles 30 and touchscreen 47 in the cab);
- Integrates two systems into one with lighting and underlift control merging with proportional boom control, using consoles 30;
- Load-sensing capability, displayed on touchscreens 32/47 and the ECU:

The signals for brake, turn, markers, and backup can be sent over the CAN network to the MVECs that turn these lights on and off. (The MVECs may include a smartbreaker and relay modules in the tool box for this purpose.) A SenderCAN module from Murphy may be used to introduce these signals on a non-PACCAR or pre-2007 PACCAR chassis. (PACCAR is the parent company of Peterbilt and Kenworth.)

The improved system preferably eliminates all of the freespool and 2-speed switches (~12 per side) that are typically used along with control levers on rotating wreckers.

In addition to providing the improvements and advantages over prior technology described above, the present invention also preserves advantages of prior systems. For example, as described in pending U.S. Ser. No. 13/565,100, using the invention, a load may be lifted by the boom and moved between positions located at the rear and to the side of the recovery vehicle, without the need to first reposition the boom using boom lift or telescoping cylinders. Such further advantages include but are not limited to: providing engine information and diagnostics; monitoring of hydraulic temperature; a video screen for backup camera use or winch-watching; timer-based features like a job timer and maintenance reminders; using a portion of the VCAN-PAC-CAR J1939 CAN bus network to transmit data through the chassis (VCAN); and a GS monitoring system for Miller's Rotator product. ("GS" is GS North America, New Berlin, Wis.)

The above description is not intended to limit the meaning of the words used in the following claims that define the invention. Persons of ordinary skill in the art will understand that a variety of other designs still falling within the scope of the following claims may be envisioned and used. For example, while preferred embodiments involving a rotating wrecker, have been disclosed, in other embodiments the wrecker mast and boom need not be capable of rotating or traveling. It is contemplated that these additional examples, as well as future modifications in structure, function, or result to that disclosed here, will exist that are not substantial changes to what is claimed here, and that all such insubstantial changes in what is claimed are intended to be covered by the claims.

We claim:

1. A wrecker-type recovery vehicle for recovering other, disabled vehicles, comprising:
    a vehicle frame extending along a longitudinal axis, the vehicle frame supporting a vehicle body and carrying an extensible and retractable boom; and
    manually-manipulable wrecker controls located on and supported by a control panel stored within an interior compartment of the wrecker supported by the vehicle body, the wrecker controls configured to control movement of one or more wrecker components useful in vehicle recovery, wherein the control panel has a base end and a distal end opposite the base end; and
    the control panel moveable from a first, storage position within the interior compartment of the vehicle body, wherein the control panel in the first position is operable to close off the interior compartment from an operator of the wrecker controls, to a second, operable position displaced from and outside the compartment and remote from the vehicle exterior, in a direction perpendicular to the longitudinal axis, wherein the control panel in the second position provides an open interior compartment in which the wrecker controls are located in a position where they may be manipulated by the operator, and wherein in the second position the control panel is downwardly-angled relative to ground such that the distal end is located remote from the vehicle body and below a horizontal axis parallel to ground and intersecting the base end, and wherein the control panel remains supported by the vehicle body while in the second position, whereby the displacement of the control panel to the second position comprises a strategic location of the wrecker controls, providing an operator with an ergonomically-enhanced work surface.

2. The wrecker-type recovery vehicle of claim 1, wherein the distance that the wrecker controls are located from the side surface of the vehicle exterior when the control panel is moved to the second position is about 1-2 feet, and wherein an operator using the control panel in the second position has substantially expanded sight-lines as opposed to sightlines provided when the operator is using the control panel when located in the first position.

3. The wrecker-type recovery vehicle of claim 1, wherein control panel comprises an outwardly-opening door associated with a compartment accessible from an exterior of the vehicle, and wherein the door can be closed to form a closed compartment.

4. The wrecker-type recovery vehicle of claim 1, wherein the control panel comprises an outwardly-sliding shelf within a compartment located within an interior of the vehicle.

5. The wrecker-type recovery vehicle of claim 1, wherein the wrecker controls are in electrical communication with a CAN Bus and CAN controller.

6. The wrecker-type recovery vehicle of claim 1, wherein the wrecker controls include boom controls.

7. The wrecker-type recovery vehicle of claim 1, wherein the wrecker controls include lighting controls.

8. The wrecker-type recovery vehicle of claim 1, wherein the wrecker controls comprise integrated electrical and hydraulic controls located on a single console.

9. The wrecker-type recovery vehicle of claim 1, wherein the wrecker controls comprise integrated electrical and hydraulic controls, each of which are located on a pair of consoles, and wherein each of the consoles are located within compartments situated on opposing sides of the wrecker.

10. The wrecker-type recovery vehicle of claim 1, wherein the vehicle frame supports a travel base assembly carrying the boom, and the travel base assembly is capable of moving along the longitudinal axis of the frame, and further comprising a plurality of traveler rollers at least partially supporting the travel base assembly and facilitating longitudinal movement of the travel base assembly relative to the vehicle frame, wherein each of the traveler rollers comprises a plurality of individual rollers linked by a chain assembly and movable about a load-bearing member.

11. The wrecker-type recovery vehicle of claim 1, wherein the boom is capable of rotating about an axis generally perpendicular to the longitudinal frame axis.

12. The wrecker-type recovery vehicle of claim 10, wherein the vehicle frame includes a travel cylinder which is a motive force for the travel base assembly.

13. The wrecker-type recovery vehicle of claim 1, wherein the wrecker controls include manual hydraulic controls which may be used in the event of an electrical failure.

14. A wrecker-type recovery vehicle for recovering other, disabled vehicles, comprising:
a vehicle frame extending along a longitudinal axis, the vehicle frame including a vehicle exterior, and the vehicle frame carrying an extensible and retractable boom; and
manually-manipulable wrecker controls located on and supported by a control panel stored within an interior compartment of the wrecker supported by the vehicle frame, wherein the control panel has a base end and a distal end opposite the base end;
wherein the wrecker controls are in electrical communication with a CAN Bus and CAN controller of the vehicle, the wrecker controls comprising integrated electrical and hydraulic controls located on a single console;
wherein the control panel is moveable from a first, storage position, thereby closing the interior compartment, to a second, operable position displaced from and outside the compartment, thereby opening the interior compartment so that the operator can manipulate the wrecker controls, wherein the control panel remains supported by the vehicle frame when the control panel is in the second position, and wherein in the second position the control panel is downwardly-angled relative to ground such that the distal end is located remote from the vehicle body and below a horizontal axis parallel to ground and intersecting the base end, whereby the displacement of the control panel to the second position comprises a strategic location of the wrecker controls, providing an operator with an ergonomically-enhanced work surface.

15. The wrecker-type recovery vehicle of claim 14, wherein the manually-manipulable wrecker controls are moveable from a first position within the vehicle exterior or a compartment therefor, to a second position located a distance from a side surface of the vehicle exterior, in a direction perpendicular to the longitudinal axis.

16. A method for controlling a wrecker-type recovery vehicle for recovering other, disabled vehicles, comprising the steps of:
providing a wrecker vehicle frame extending along a longitudinal axis, the vehicle frame including a vehicle body with side surfaces, and the vehicle frame carrying an extensible and retractable boom; and
providing manually-manipulable wrecker controls located on and supported by a control panel, the control panel supported by the vehicle body and stored within an interior compartment of the vehicle body, the control panel comprising an outwardly-opening door associated with the interior compartment accessible from an exterior of the vehicle, and wherein when the door is closed a closed interior compartment is provided, and when the door is open this exposes the wrecker controls to operator manipulation;
wherein when the control panel door is opened, the control panel is moveable from a first, storage position within the interior compartment inside the vehicle exterior, to a second, operable position in which the control panel is displaced from and outside the interior compartment and the vehicle exterior, in a direction perpendicular to the longitudinal axis, wherein the control panel remains supported by the vehicle body while in the second position;
whereby the wrecker controls can be manipulated when in the second position, such that an operator in a standing position adjacent the vehicle body and working the wrecker controls when the control panel is in the second position, has substantially expanded sightlines as opposed to when the operator is in a standing position working the wrecker controls when the control panel is in the first position, and wherein the displacement of the control panel to the second position comprises a strategic location of the wrecker controls, providing an operator with an ergonomically-enhanced work surface.

17. The method of claim 16, wherein the wrecker controls include one or more of the following: boom, winch, underlift, outrigger and lighting controls.

18. The method of claim 16, wherein the vehicle frame supports a travel base assembly carrying the boom, the travel base assembly is capable of moving along the longitudinal axis of the frame, and the travel base assembly supports a rotating member allowing the boom to be rotated about a vertical axis substantially perpendicular to the longitudinal axis of the frame, and further comprising two or more traveler rollers at least partially supporting the travel base assembly and facilitating longitudinal movement of the travel base assembly relative to the vehicle frame, wherein the traveler rollers comprise a plurality of individual rollers linked by a chain assembly and movable about a load-bearing member.

19. The method of claim 16, further comprising two or more traveler rollers at least partially supporting the travel base assembly and facilitating longitudinal movement of the travel base assembly relative to the vehicle frame, wherein the traveler rollers comprise a plurality of rollers linked by a chain assembly and movable about a load-bearing member.

20. The method of claim 16, further comprising the step of using the boom to lift a load either: (a) from a position adjacent a rear of the recovery vehicle to a position both rearwardly and substantially distant from the rear of the wrecker; or (b) from a position adjacent a front of the recovery vehicle to a position adjacent a side of the recovery vehicle.

21. The method of claim 16, wherein the control panel is mounted on a support positioned at a downwardly-angled orientation relative to ground to facilitate the creation of an ergonomic-oriented work station.

22. A wrecker-type recovery vehicle for recovering other, disabled vehicles, comprising:

a vehicle frame extending along a longitudinal axis, the vehicle frame supporting a vehicle body and carrying an extensible and retractable boom; and manually-manipulable wrecker controls located on and supported by a control panel comprising an outwardly-sliding shelf, the control panel supported by the vehicle body and stored within an interior compartment of the vehicle body, wherein the wrecker controls are configured to control movement of one or more wrecker components useful in vehicle recovery;

a door separate from the control panel for closing and opening the interior compartment, wherein the door is sliding and generally vertically moving;

wherein, using the shelf, the control panel is moveable from a first, storage position within the interior compartment, to a second, operable position displaced from and outside the compartment, in a direction perpendicular to the longitudinal axis, wherein the control panel remains supported by the vehicle body while in the second position, and whereby the displacement of the control panel to the second position comprises a strategic location of the wrecker controls, providing an operator with an ergonomically-enhanced work surface.

* * * * *